United States Patent [19]

Sackman

[11] 4,288,866
[45] Sep. 8, 1981

[54] ULTRASONIC IMAGE SYSTEM

[75] Inventor: George L. Sackman, Carmel Valley, Calif.

[73] Assignee: The United States of America as represented by the Secretary of the Navy, Washington, D.C.

[21] Appl. No.: 83,044

[22] Filed: Oct. 9, 1979

[51] Int. Cl.³ ............................................. G01S 7/20
[52] U.S. Cl. ................................. 367/11; 343/5 CM; 343/5 PN; 343/7.9; 367/88
[58] Field of Search .................... 367/11, 88; 343/7.9, 343/5 CM, 5 PN

[56] References Cited

U.S. PATENT DOCUMENTS

| 3,487,409 | 12/1969 | Thiele et al. | 343/17.2 |
| 3,631,490 | 12/1971 | Palmieri | 343/7.7 |
| 3,682,553 | 8/1972 | Kapany | 343/7.9 X |
| 3,887,917 | 6/1975 | Howard et al. | 343/7.9 |
| 3,906,496 | 9/1975 | Goodrich | 343/9 |
| 3,913,099 | 10/1975 | Wehner et al. | 343/5 SA |
| 4,023,175 | 5/1977 | Brown et al. | 343/17 |
| 4,207,620 | 6/1980 | Morgera | 367/88 |

Primary Examiner—Richard A. Farley
Attorney, Agent, or Firm—R. S. Sciascia; Charles D. B. Curry; Francis I. Gray

[57] ABSTRACT

A contour map underwater ultrasonic image system simultaneously uses a large time-bandwidth product signal waveforms for extremely fine range resolution, and an image memory organized as a three-dimensional data base of object reflectivity. The transmitted waveform is a pseudo-random coded signal. A plurality of correlator receivers produce a time-compressed pulse for each angular resolution cell. An image memory receives the output of the correlator receivers and builds up a three-dimensional data base of echoes in the form of a set of contour lines for each range cell. Standard computer-graphic techniques are used to accept the three-dimensional data base and generate displays to assist an operator in identifying the object.

12 Claims, 1 Drawing Figure

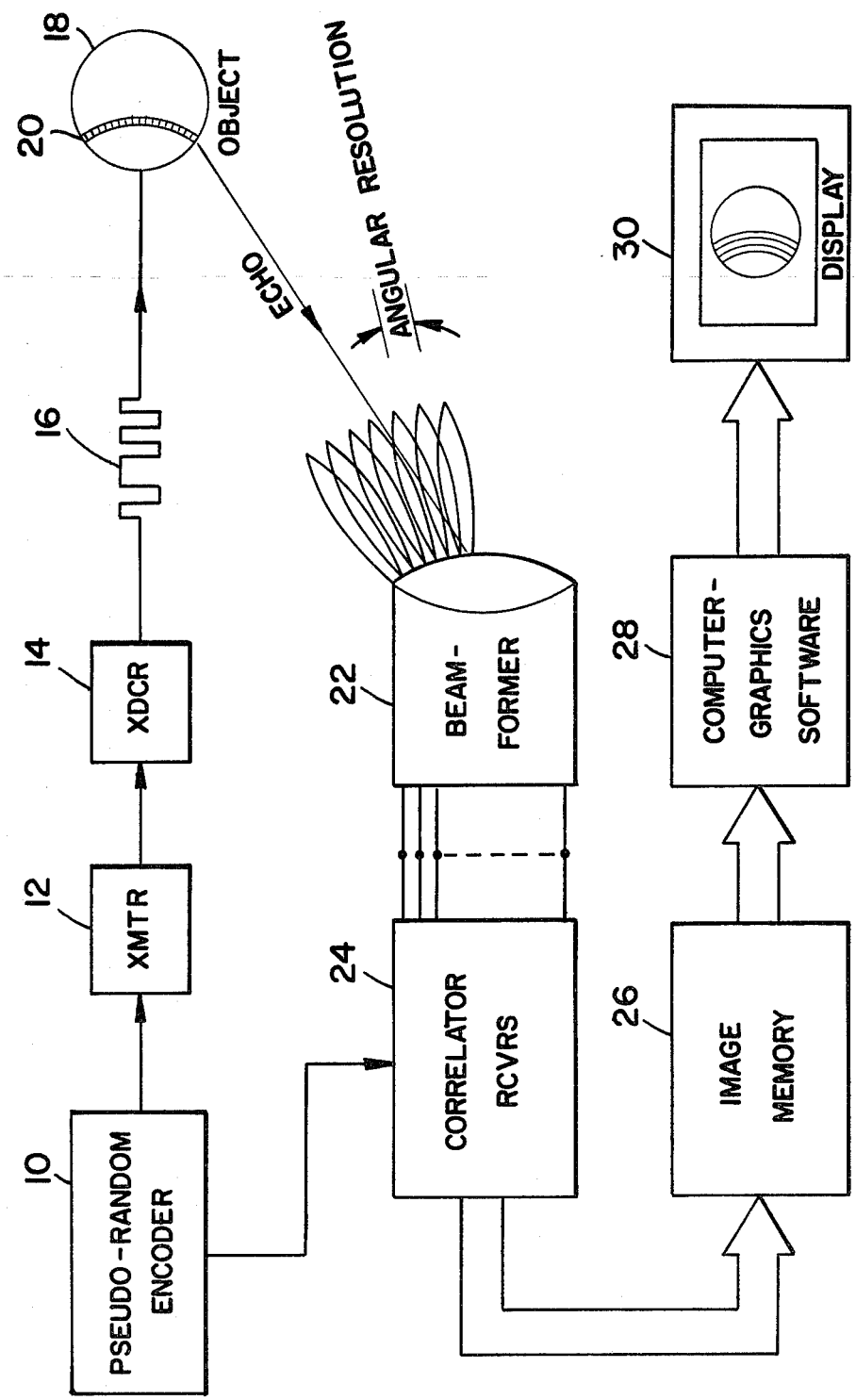

ULTRASONIC IMAGE SYSTEM

BACKGROUND OF THE INVENTION

1. Field of the Invention

The present invention relates to imaging systems, and more particularly to a method of forming images of objects using ultrasonic sound waves.

2. Description of Prior Art

Conventional echo ranging image systems such as those using ultrasonic sound waves employ signal pulses with spectra of relatively narrow bandwidth centered at a carrier frequency. The received echoes are normally processed by a beamformer, such as a lens, phased array, holographic receiver, etc., to determine the direction of arrival, and by an envelope detector to determine pulse echo arrival time, and hence the distance to the object. The distance resolution is normally not sufficient to distinguish range differences to individual portions of the object. This last characteristic of conventional systems is due to the relationship between signal spectrum bandwidth and time duration of the pulse.

In order to secure sufficient pulse energy to overcome the attenuation of the medium, such as water, and with a physical limit on the peak power available for transmission set by transducers and electronics, pulses are required to be of a length such that they entirely encompass objects of interest. Therefore, the "depth of field" is great enough that portions of the object with high reflectivity, so-called specular highlights, completely dominate the system. Non-linearities of receiver response and leakage between angular resolution cells often cause complete saturation of the receiver. Large portions of the object are thus "overexposed". What is even more serious is that visual clues for recognition of the shape of the object most often originate from surfaces where reflectivity is low. The display, therefore, contains large amounts of high intensity reflected energy from specular facets of the object which "wash out" the desired low intensity reflections from which the nature of the object can be identified. Additionally, large regions of the medium surrounding the object may contain many small scatterers which cause the object to be obscured.

SUMMARY OF THE INVENTION

Accordingly, the present invention provides a contour map underwater ultrasonic image system which simultaneously uses large time-bandwidth product signal waveforms for extremely fine range resolution, and an image memory organized as a three-dimensional data base of object reflectivity. The transmitted waveform is a pseudo-random coded signal. A plurality of correlator receivers produce a time-compressed pulse for each angular resolution cell. An image memory receives the output of the correlator receivers and builds up a three-dimensional data base of echoes in the form of a set of contour lines for each range cell. Standard computer-graphic techniques are used to accept the three-dimensional data base and generate displays to assist an operator in identifying the object.

Therefore, it is an object of the present invention to provide an ultrasonic image system which suppresses specular highlights.

Another object of the invention is to provide an ultrasonic image system which suppresses volume backscatter.

Still another object of the present invention is to provide an ultrasonic image system in which moving objects are readily distinguishable from stationary ones.

Yet another object of the present invention is to provide an ultrasonic image system where objects can be rotated in the display and hidden-line contours suppressed.

Other objects, advantages and novel features of the present invention will be apparent from the following detailed description when read together with the appended claims and attached drawing.

BRIEF DESCRIPTION OF THE DRAWING

The FIGURE is a block diagram of an ultrasonic image system according to the present invention.

DESCRIPTION OF THE PREFERRED EMBODIMENT

The theory of signal processing provides well-known techniques for using signals with high time-bandwidth products along with matched filter receivers to achieve excellent range, i.e., echo arrival time, resolution along with high pulse energy. Referring to the FIGURE a pseudo-random encoder 10 modulates a transmitter 12. The transmitter 12 excites a transducer 14 to output a pseudo-random pulse 16. The pulse 16 is reflected from an object 18. A beamformer 22 having a fine angular resolution outputs a plurality of echoes, one for each angular resolution cell, to a corresponding plurality of correlator receivers 24. The correlator receivers 24 correlate the received echoes with a stored replica of the pulse 16 from the encoder 10 to extract data in the form of a contour strip 20 having a width equal to the fine range resolution.

For underwater ultrasonic imaging, let the bandwidth be 200 KHz and the pulse length be 5 milliseconds, and the output of each correlator receiver 24 is a time-compressed pulse of 5 microseconds duration. Therefore, the depth of field in a single range cell, or the fine range resolution, is:

$$z = c/W$$

where c is the velocity of sound in water (approximately 1500 m/sec) and W is the bandwidth. Solving for z the resolution is 7.5 millimeters. Range resolution of this magnitude is fine enough that reflections from the object 18 within this depth of field is confined to the contour strip 20. Specular facets comprise only a negligible portion of such a strip 20, hence the gain of the system is made high enough to detect echoes from the predominately low reflectivity regions in the strip without significant danger of saturating the receivers 24 with specular returns. The correlator receivers 24 suppress any remaining saturation effect of specular highlights since the correlator receivers respond only to the degree of correlation between the phase signature, or code, of the echoes compared to the stored replica. Using large-scale-integrated (LSI) circuit technology the correlator receivers 24 can be easily constructed in large numbers (on the order of several thousand) from relatively inexpensive digital circuit hardware.

A pulse length of 5 milliseconds in this example provides ample pulse energy to achieve useful range with reasonable transmitter peak power as calculated using standard echo-ranging formulas. The correlator receivers 24 also have excellent doppler resolution, as they reject echoes which have been significantly compressed or expanded in time due to reflection from moving objects. Alternatively, compensation for desired amounts of doppler can be provided in the correlators 24 so that further separation of objects in terms of velocity relative to the receiver is allowed. For the given parameters velocity resolution would be 1.5 m/sec.

Since the range is divided into a large number of resolution cells, the object 18 produces in effect a set of contour strips 20, one for each range cell. To achieve a display in which an object is recognizable the contour strips 20 are assembled into a composite graphic display in an image memory 26 by building up a three-dimensional data base of echoes. Standard computer-graphics software 28 manipulates the three-dimensional data base from the image memory 26 and generates a representation of the object 18 on a display 30. The computer-graphics software 28 incorporates hidden-line removal, object rotation and other features which assist an operator in identifying the object 18 whose contours 20 are stored in the image memory 26.

The echoes processed in the correlator receivers 24 are also compared to a threshold and only echoes above a minimum energy are entered into the memory 26. Thresholding rejects weak echoes scattered from particles in the medium, such as bubbles, referred to commonly as "volume reverberation". Volume backscatter returns are effectively suppressed by the fine range resolution of the system since relatively few scatterers are present within any given range cell at a given angular resolution cell. Thresholding also rejects other random sources of background noise which the correlator receivers 24 have not already suppressed.

A further feature of the image memory 26 is signal averaging. Several echoes from each resolution cell are averaged in the memory 26 so that only echoes which are consistently present due to the object 18 are retained. Sporadic echoes due to noise or volume backscatter are further suppressed.

Thus, the present invention provides a great advance in the art of ultrasonic imaging, which in the past has suffered from poor image quality making identification of objects almost impossible, by suppressing specular highlights, volume backscatter and random noise, by distinguishing moving objects from stationary ones, and by rotating objects in the display while suppressing hidden-line contours, all of which assist in object identification. The present invention may be applied to other echo-ranging systems using any type of wave energy which can be modulated and focused to the required resolution, such as radar, electro-optic, infra-red, etc. The essential requirement is fine range and angular resolution in combination with thresholding, averaging and data storage in a three-dimensional memory for computer-graphics controlled display.

What is claimed is:
1. An ultrasonic image system comprising:
   (a) a transmitter for transmitting a large time-bandwidth product signal waveform;
   (b) means for pulse modulating said transmitter to produce a coded output pulse;
   (c) means for converting said coded output pulse into ultrasonic energy;
   (d) a beamformer having a plurality of fine angular resolution cells for receiving the echoes of said coded output pulse reflected from an object to be imaged;
   (e) means for correlating said received echoes with a replica of said coded output pulse from said pulse modulating means such that each of said resolution cells receiving said echoes responds only to the correlation between said echoes and said stored replica;
   (f) means for storing the output of said correlating means for each of said range cells in the form of a three-dimensional data base of object reflectivity; and
   (g) means for displaying said three-dimensional data base in a graphic form which readily assists in object identification.
2. An ultrasonic image system as recited in claim 1 wherein said correlating means further comprises means for separating a plurality of said objects in terms of velocity relative to said ultrasonic image system.
3. An ultrasonic image system as recited in claim 2 wherein said correlating means further comprises means for comparing said echoes to a threshold so that only said echoes which exceed said threshold are input to said storing means.
4. An ultrasonic image system as recited in claim 1 wherein said storing means comprises an image memory which stores the output of said correlating means in the form of contour strips having a width equal to the fine range resolution cells.
5. An ultrasonic image system as recited in claim 4 wherein said storing means further comprises means for averaging a plurality of said echoes from each of the reslution cells formed by said fine angular and fine range resolution cells.
6. An ultrasonic image system as recited in claim 1 wherein said displaying means comprises:
   (a) means for manipulating said three-dimensional data base in said storing means; and
   (b) means for generating a representation of said object on a display device.
7. A contour map underwater imaging system for identifying an object comprising:
   (a) a pseudo-random coded signal generator;
   (b) a beamformer having a plurality of fine angular resolution cells to receive echoes reflected from said object;
   (c) a plurality of correlation receivers, one for each of said fine angular resolution cells, which process said echoes and output a set of time-compressed pulses having a fine range resolution in the form of contour strips of said object;
   (d) an image memory which stores said contour strips in the form of a three-dimensional data base; and
   (e) a computer-graphics display which manipulates said three-dimensional data base to produce an object display which assists in identification of said object.
8. An imaging system as recited in claim 7 wherein said pseudo-random coded signal generator comprises:
   (a) a transmitter;
   (b) means for pulse modulating said transmitter with a pseudo-random code to produce a coded output pulse; and
   (c) means for converting said coded output pulse into ultrasonic energy for transmission in a fluid medium.
9. An imaging system as recited in claim 8 wherein each of said correlation receivers further comprises means for comparing said echoes to a threshold so that only said echoes which exceed said threshold are stored in said image memory.

10. An imaging system as recited in claim 9 wherein each of said correlation receivers further comprises means for separating a plurality of said objects in terms of velocity relative to said imaging system.

11. An imaging system as recited in claims 7, 8 or 10 wherein said image memory further comprises means for averaging a plurality of said echoes from each of the resolution cells formed by said fine angular resolution cells and said contour strips.

12. An imaging system as recited in claims 7, 8 or 10 wherein said computer-graphics display comprises:
 (a) a computer having computer-graphics software to manipulate said three-dimensional data base; and
 (b) a video display device to display said object display from said computer.

* * * * *